(12) United States Patent
Krajec

(10) Patent No.: US 9,754,396 B2
(45) Date of Patent: *Sep. 5, 2017

(54) EVENT CHAIN VISUALIZATION OF PERFORMANCE DATA

(71) Applicant: MICROSOFT TECHNOLOGY LICENSING, LLC, Redmond, WA (US)

(72) Inventor: Russell S. Krajec, Loveland, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/883,554

(22) Filed: Oct. 14, 2015

(65) Prior Publication Data
US 2016/0035115 A1    Feb. 4, 2016

(51) Int. Cl.
*G06T 11/20* (2006.01)
*G06F 11/32* (2006.01)

(52) U.S. Cl.
CPC .......... *G06T 11/206* (2013.01); *G06F 11/323* (2013.01); *G06T 11/203* (2013.01)

(58) Field of Classification Search
None
See application file for complete search history.

(56) References Cited

U.S. PATENT DOCUMENTS

| | | |
|---|---|---|
| 5,293,620 A | 3/1994 | Barabash et al. |
| 5,327,568 A | 7/1994 | Maejima et al. |
| 5,642,511 A | 6/1997 | Chow et al. |
| 5,732,277 A | 3/1998 | Kodosky et al. |
| 5,740,440 A | 4/1998 | West |
| 5,758,183 A | 5/1998 | Scales |
| 5,778,004 A | 7/1998 | Jennion et al. |
| 5,835,085 A | 11/1998 | Eick et al. |
| 5,852,449 A | 12/1998 | Esslinger et al. |
| 5,946,488 A | 8/1999 | Tanguay et al. |
| 5,999,192 A | 12/1999 | Selfridge et al. |
| 6,003,143 A | 12/1999 | Kim et al. |

(Continued)

FOREIGN PATENT DOCUMENTS

| | | |
|---|---|---|
| CN | 101627388 | 1/2010 |
| CN | 102592079 | 7/2012 |

(Continued)

OTHER PUBLICATIONS

Office Action dated Aug. 26, 2016 cited in U.S. Appl. No. 13/949,994.

(Continued)

*Primary Examiner* — Maurice L McDowell, Jr.
(74) *Attorney, Agent, or Firm* — Workman Nydegger

(57) ABSTRACT

An event chain visualization of performance data may show the execution of monitored elements as bars on a timeline, with connections or other relationships connecting the various bars into a sequential view of an application. The visualization may include color, shading, or other highlighting to show resource utilization or performance metrics. The visualization may be generated by monitoring many events processed by an application, where each bar on a timeline may reflect multiple instances of a monitored element and, in some case, the aggregated performance.

20 Claims, 5 Drawing Sheets

(56) References Cited

U.S. PATENT DOCUMENTS

| | | |
|---|---|---|
| 6,026,362 A | 2/2000 | Kim et al. |
| 6,038,395 A | 3/2000 | Chow et al. |
| 6,108,340 A | 8/2000 | Rolfe et al. |
| 6,202,199 B1 | 3/2001 | Wygodny et al. |
| 6,219,826 B1 | 4/2001 | De Pauw et al. |
| 6,226,787 B1 | 5/2001 | Serra et al. |
| 6,243,857 B1 | 6/2001 | Logan et al. |
| 6,266,804 B1 | 7/2001 | Isman |
| 6,282,701 B1 | 8/2001 | Wygodny et al. |
| 6,374,271 B1 | 4/2002 | Shimizu |
| 6,661,431 B1 | 12/2003 | Stuart |
| 6,681,384 B1 | 1/2004 | Bates et al. |
| 6,742,003 B2 | 5/2004 | Heckerman et al. |
| 6,748,585 B2 | 6/2004 | Proebsting |
| 6,775,423 B2 | 8/2004 | Kulkarni |
| 6,792,460 B2 | 9/2004 | Oulu |
| 6,792,595 B1 | 9/2004 | Storistenau et al. |
| 6,862,727 B2 | 3/2005 | Stevens |
| 6,938,186 B2 | 8/2005 | Das et al. |
| 7,058,928 B2 | 6/2006 | Wygodny et al. |
| 7,093,234 B2 | 8/2006 | Hibbeler et al. |
| 7,120,901 B2 | 10/2006 | Ferri et al. |
| 7,174,536 B1 | 2/2007 | Kothari et al. |
| 7,194,664 B1 | 3/2007 | Fung et al. |
| 7,203,925 B1 | 4/2007 | Michael et al. |
| 7,219,300 B2 | 5/2007 | Arquie |
| 7,386,839 B1 | 6/2008 | Golender et al. |
| 7,468,727 B2 | 12/2008 | Wong |
| 7,472,378 B2 | 12/2008 | Bennett |
| 7,509,343 B1 | 3/2009 | Washburn |
| 7,543,281 B2 | 6/2009 | King et al. |
| 7,574,675 B1 | 8/2009 | Linker |
| 7,607,169 B1 | 10/2009 | Njemanze et al. |
| 7,620,947 B2 | 11/2009 | Krishnaswamy |
| 7,624,380 B2 | 11/2009 | Okada |
| 7,639,256 B1 | 12/2009 | Yablonski |
| 7,650,574 B2 | 1/2010 | Nattinger |
| 7,657,873 B2 | 2/2010 | Horton et al. |
| 7,681,182 B1 | 3/2010 | Mistry et al. |
| 7,788,640 B2 | 8/2010 | Grimaldi |
| 7,814,453 B2 | 10/2010 | Stevens et al. |
| 7,827,539 B1 | 11/2010 | Wygodny et al. |
| 7,853,930 B2 | 12/2010 | Mitchell et al. |
| 7,865,872 B2 | 1/2011 | Chamieh et al. |
| 8,024,708 B2 | 9/2011 | Demetriou |
| 8,032,866 B1 | 10/2011 | Golender et al. |
| 8,056,059 B2 | 11/2011 | Chockler |
| 8,069,145 B2 | 11/2011 | Surtani |
| 8,286,142 B2 | 10/2012 | Fjeldstad et al. |
| 8,312,056 B1 | 11/2012 | Peng et al. |
| 8,312,435 B2 | 11/2012 | Wygodny et al. |
| 8,316,354 B2 | 11/2012 | Vanrenen |
| 8,359,584 B2 | 1/2013 | Rao et al. |
| 8,381,178 B2 | 2/2013 | Martino et al. |
| 8,406,565 B1 | 3/2013 | Schildan |
| 8,490,055 B2 | 7/2013 | Basak |
| 8,495,598 B2 | 7/2013 | Gounares et al. |
| 8,516,443 B2 | 8/2013 | Li |
| 8,543,983 B2 | 9/2013 | Murthy |
| 8,572,575 B2 | 10/2013 | Berlyant et al. |
| 8,595,743 B2 | 11/2013 | Gounares et al. |
| 8,607,018 B2 | 12/2013 | Gounares et al. |
| 8,615,766 B2 | 12/2013 | Gounares et al. |
| 8,640,100 B2 | 1/2014 | Neumann et al. |
| 8,640,104 B2 | 1/2014 | McEntee |
| 8,650,538 B2 | 2/2014 | Gounares et al. |
| 8,656,134 B2 | 2/2014 | Gounares et al. |
| 8,656,135 B2 | 2/2014 | Gounares et al. |
| 8,656,359 B2 | 2/2014 | Savov |
| 8,656,378 B2 | 2/2014 | Gounares et al. |
| 8,681,155 B2 | 3/2014 | Basak |
| 8,694,574 B2 | 4/2014 | Gounares et al. |
| 8,700,838 B2 | 4/2014 | Gounares et al. |
| 8,707,326 B2 | 4/2014 | Garrett |
| 8,713,064 B1 | 4/2014 | Khafizov |
| 8,726,255 B2 | 5/2014 | Gounares et al. |
| 8,745,591 B2 | 6/2014 | De Smet et al. |
| 8,745,594 B1 | 6/2014 | Iossiphidis |
| 8,752,021 B2 | 6/2014 | Li et al. |
| 8,752,034 B2 | 6/2014 | Gounares et al. |
| 8,756,581 B2 | 6/2014 | Castanos et al. |
| 8,793,656 B2 | 7/2014 | Huang |
| 8,943,441 B1 | 1/2015 | Patrick |
| 8,966,452 B2 | 2/2015 | Gataullin et al. |
| 8,990,777 B2 | 3/2015 | Gounares et al. |
| 8,997,056 B2 | 3/2015 | Li et al. |
| 9,256,969 B2 | 2/2016 | Krajec |
| 9,280,841 B2 * | 3/2016 | Krajec .................. G06T 11/206 |
| 9,292,415 B2 | 3/2016 | Seto et al. |
| 9,298,588 B2 | 3/2016 | Seto et al. |
| 9,298,589 B2 | 3/2016 | Gautallin et al. |
| 9,311,213 B2 | 4/2016 | Seto et al. |
| 9,323,863 B2 | 4/2016 | Krajec et al. |
| 9,437,024 B2 | 9/2016 | Krajec |
| 2001/0034859 A1 | 10/2001 | Swoboda |
| 2002/0007297 A1 | 1/2002 | Clarke |
| 2002/0073063 A1 | 6/2002 | Faraj |
| 2002/0085041 A1 | 7/2002 | Ishikawa |
| 2002/0087949 A1 | 7/2002 | Golender |
| 2002/0138788 A1 | 9/2002 | Yenne et al. |
| 2002/0157086 A1 | 10/2002 | Lewis et al. |
| 2002/0163498 A1 | 11/2002 | Chang et al. |
| 2002/0178185 A1 | 11/2002 | Kuchinsky et al. |
| 2002/0196229 A1 | 12/2002 | Chen et al. |
| 2002/0199172 A1 | 12/2002 | Bunnell |
| 2003/0037248 A1 | 2/2003 | Launchbury et al. |
| 2003/0061574 A1 | 3/2003 | Saluja et al. |
| 2003/0067481 A1 | 4/2003 | Chedgey et al. |
| 2003/0088854 A1 | 5/2003 | Wygodny et al. |
| 2003/0106046 A1 | 6/2003 | Arnold |
| 2003/0140280 A1 | 7/2003 | Kaler et al. |
| 2004/0012638 A1 | 1/2004 | Donnelli et al. |
| 2004/0015929 A1 | 1/2004 | Lewis et al. |
| 2004/0073529 A1 | 4/2004 | Stanfill |
| 2004/0083425 A1 | 4/2004 | Dorwart |
| 2004/0117172 A1 | 6/2004 | Shibata |
| 2004/0117768 A1 | 6/2004 | Chang et al. |
| 2004/0128093 A1 | 7/2004 | Cragun et al. |
| 2004/0154016 A1 | 8/2004 | Randall |
| 2004/0181554 A1 | 9/2004 | Heckerman et al. |
| 2004/0205302 A1 | 10/2004 | Cantrill |
| 2005/0021318 A1 | 1/2005 | Inoue et al. |
| 2005/0102636 A1 | 5/2005 | McKeon |
| 2005/0120333 A1 | 6/2005 | Inoue et al. |
| 2005/0177820 A1 | 8/2005 | Mei et al. |
| 2005/0180330 A1 | 8/2005 | Shapiro |
| 2005/0188272 A1 | 8/2005 | Bodorin et al. |
| 2005/0204344 A1 | 9/2005 | Shinomi |
| 2005/0262470 A1 | 11/2005 | Gavrilov |
| 2005/0278208 A1 | 12/2005 | Schultz |
| 2006/0015612 A1 | 1/2006 | Shimazaki et al. |
| 2006/0015850 A1 | 1/2006 | Poole |
| 2006/0075390 A1 | 4/2006 | McAllister |
| 2006/0106843 A1 | 5/2006 | Middelfart et al. |
| 2006/0130016 A1 | 6/2006 | Wagner |
| 2006/0182133 A1 | 8/2006 | Choumaru |
| 2006/0212852 A1 | 9/2006 | Hwang |
| 2006/0242627 A1 | 10/2006 | Wygodny et al. |
| 2006/0248177 A1 | 11/2006 | Dostert et al. |
| 2006/0265397 A1 | 11/2006 | Bryan et al. |
| 2007/0022000 A1 | 1/2007 | Bodart et al. |
| 2007/0028189 A1 | 2/2007 | Robbins |
| 2007/0050174 A1 | 3/2007 | DeWitt et al. |
| 2007/0060205 A1 | 3/2007 | Kim |
| 2007/0118538 A1 | 5/2007 | Ahern et al. |
| 2007/0118909 A1 | 5/2007 | Hertzog |
| 2007/0140131 A1 | 6/2007 | Malloy et al. |
| 2007/0143795 A1 | 6/2007 | Tran |
| 2007/0198952 A1 | 8/2007 | Pittenger |
| 2008/0049022 A1 | 2/2008 | Sherb et al. |
| 2008/0065668 A1 | 3/2008 | Spence et al. |
| 2008/0092121 A1 | 4/2008 | DeRose et al. |
| 2008/0104225 A1 | 5/2008 | Zhang |
| 2008/0104451 A1 | 5/2008 | Blanchard et al. |

(56) References Cited

U.S. PATENT DOCUMENTS

| | | |
|---|---|---|
| 2008/0104570 A1 | 5/2008 | Chedgey et al. |
| 2008/0120400 A1 | 5/2008 | Keller et al. |
| 2008/0126003 A1 | 5/2008 | Goldstein et al. |
| 2008/0127108 A1 | 5/2008 | Ivanov et al. |
| 2008/0127109 A1 | 5/2008 | Simeon |
| 2008/0127112 A1 | 5/2008 | Kettley et al. |
| 2008/0140985 A1 | 6/2008 | Kitamorn et al. |
| 2008/0155348 A1 | 6/2008 | Ivanov et al. |
| 2008/0155349 A1 | 6/2008 | Ivanov et al. |
| 2008/0163124 A1 | 7/2008 | Bonev et al. |
| 2008/0168472 A1 | 7/2008 | Wilson |
| 2008/0256233 A1 | 10/2008 | Hall |
| 2008/0256466 A1 | 10/2008 | Salvador et al. |
| 2008/0256518 A1 | 10/2008 | Aoshima et al. |
| 2008/0271038 A1 | 10/2008 | Rolia et al. |
| 2008/0282232 A1 | 11/2008 | Cong et al. |
| 2008/0313502 A1 | 12/2008 | Mcfadden et al. |
| 2009/0037407 A1 | 2/2009 | Yang et al. |
| 2009/0037873 A1 | 2/2009 | Ahadian et al. |
| 2009/0049428 A1 | 2/2009 | Cozmei |
| 2009/0089765 A1 | 4/2009 | Guo et al. |
| 2009/0113399 A1 | 4/2009 | Tzoref et al. |
| 2009/0150874 A1 | 6/2009 | Chung et al. |
| 2009/0157723 A1 | 6/2009 | De et al. |
| 2009/0271729 A1 | 10/2009 | Killoren |
| 2009/0307630 A1 | 12/2009 | Kawai et al. |
| 2009/0313525 A1 | 12/2009 | Savin et al. |
| 2009/0319996 A1 | 12/2009 | Shafi et al. |
| 2010/0005249 A1 | 1/2010 | Bates |
| 2010/0011341 A1 | 1/2010 | Baierl et al. |
| 2010/0042944 A1 | 2/2010 | Robinson et al. |
| 2010/0070505 A1 | 3/2010 | Kao et al. |
| 2010/0077388 A1 | 3/2010 | Kimura |
| 2010/0083178 A1 | 4/2010 | Zui et al. |
| 2010/0083185 A1 | 4/2010 | Sakai |
| 2010/0088665 A1 | 4/2010 | Langworthy et al. |
| 2010/0134501 A1 | 6/2010 | Lowe |
| 2010/0138431 A1 | 6/2010 | Bator et al. |
| 2010/0153786 A1 | 6/2010 | Matsukawa |
| 2010/0167256 A1 | 7/2010 | Blash |
| 2010/0180245 A1 | 7/2010 | Rutten |
| 2010/0223581 A1 | 9/2010 | Manolescu et al. |
| 2010/0235771 A1 | 9/2010 | Gregg, III |
| 2010/0281468 A1 | 11/2010 | Pavlyushchik |
| 2010/0281488 A1 | 11/2010 | Krishnamurthy et al. |
| 2010/0295856 A1 | 11/2010 | Ferreira et al. |
| 2010/0333039 A1 | 12/2010 | Denkel |
| 2011/0004598 A1 | 1/2011 | Kikuchi |
| 2011/0066973 A1 | 3/2011 | Plom et al. |
| 2011/0072309 A1 | 3/2011 | Sakai et al. |
| 2011/0078487 A1 | 3/2011 | Nielsen et al. |
| 2011/0126286 A1 | 5/2011 | Nazarov |
| 2011/0153817 A1 | 6/2011 | Wright et al. |
| 2011/0154300 A1 | 6/2011 | Rao et al. |
| 2011/0191343 A1 | 8/2011 | Heaton |
| 2011/0209153 A1 | 8/2011 | Suzuki et al. |
| 2011/0249002 A1 | 10/2011 | Duplessis et al. |
| 2011/0289485 A1 | 11/2011 | Mejdrich et al. |
| 2011/0314343 A1 | 12/2011 | Hoke et al. |
| 2011/0314543 A1 | 12/2011 | Treit et al. |
| 2012/0023475 A1 | 1/2012 | Surazski et al. |
| 2012/0042212 A1 | 2/2012 | Laurenti |
| 2012/0042269 A1 | 2/2012 | Holman |
| 2012/0047421 A1 | 2/2012 | Holman |
| 2012/0079108 A1 | 3/2012 | Findeisen |
| 2012/0079456 A1 | 3/2012 | Kannan et al. |
| 2012/0102029 A1 | 4/2012 | Larson et al. |
| 2012/0117438 A1 | 5/2012 | Shaffer et al. |
| 2012/0137240 A1 | 5/2012 | Krueger |
| 2012/0137273 A1 | 5/2012 | Meijler et al. |
| 2012/0159391 A1 | 6/2012 | Berry et al. |
| 2012/0204156 A1 | 8/2012 | Kettley et al. |
| 2012/0221314 A1 | 8/2012 | Bourlatchkov et al. |
| 2012/0222019 A1 | 8/2012 | Gounares et al. |
| 2012/0222043 A1 | 8/2012 | Gounares et al. |
| 2012/0227040 A1 | 9/2012 | Gounares et al. |
| 2012/0233592 A1 | 9/2012 | Gounares et al. |
| 2012/0233601 A1 | 9/2012 | Gounares et al. |
| 2012/0260135 A1 | 10/2012 | Beck et al. |
| 2012/0290672 A1 | 11/2012 | Robinson et al. |
| 2012/0296991 A1 | 11/2012 | Spivack et al. |
| 2012/0317371 A1 | 12/2012 | Gounares et al. |
| 2012/0317389 A1 | 12/2012 | Gounares et al. |
| 2012/0317421 A1 | 12/2012 | Gounares et al. |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0323827 A1 | 12/2012 | Lakshmanan et al. |
| 2012/0324454 A1 | 12/2012 | Gounares et al. |
| 2012/0330700 A1 | 12/2012 | Garg et al. |
| 2013/0018925 A1 | 1/2013 | Pegg |
| 2013/0060372 A1 | 3/2013 | Lokowandt et al. |
| 2013/0061212 A1 | 3/2013 | Krause et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0104107 A1 | 4/2013 | De et al. |
| 2013/0117280 A1 | 5/2013 | Donaldson |
| 2013/0117753 A1 | 5/2013 | Gounares et al. |
| 2013/0117759 A1 | 5/2013 | Gounares et al. |
| 2013/0145350 A1 | 6/2013 | Marinescu |
| 2013/0159198 A1 | 6/2013 | Cartan |
| 2013/0187941 A1 | 7/2013 | Noon |
| 2013/0212479 A1 | 8/2013 | Willis |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec |
| 2013/0232174 A1 | 9/2013 | Krajec |
| 2013/0232433 A1 | 9/2013 | Krajec |
| 2013/0232452 A1 | 9/2013 | Krajec |
| 2013/0235040 A1 | 9/2013 | Jackson, Jr. |
| 2013/0271480 A1 | 10/2013 | Daynes |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares et al. |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0291113 A1 | 10/2013 | Dewey |
| 2013/0298112 A1 | 11/2013 | Gounares et al. |
| 2014/0013306 A1 | 1/2014 | Gounares et al. |
| 2014/0013308 A1 | 1/2014 | Gounares et al. |
| 2014/0013311 A1 | 1/2014 | Garrett et al. |
| 2014/0019598 A1 | 1/2014 | Krajec et al. |
| 2014/0019756 A1 | 1/2014 | Krajec et al. |
| 2014/0019879 A1 | 1/2014 | Krajec |
| 2014/0019985 A1 | 1/2014 | Krajec et al. |
| 2014/0025572 A1 | 1/2014 | Krajec et al. |
| 2014/0026142 A1 | 1/2014 | Gounares et al. |
| 2014/0040591 A1 | 2/2014 | Gounares et al. |
| 2014/0053143 A1 | 2/2014 | Conrod et al. |
| 2014/0136233 A1 | 5/2014 | Atkinson et al. |
| 2014/0189650 A1 | 7/2014 | Gounares |
| 2014/0189651 A1 | 7/2014 | Gounares |
| 2014/0189652 A1 | 7/2014 | Gounares |
| 2014/0215444 A1 | 7/2014 | Voccio et al. |
| 2014/0278539 A1 | 9/2014 | Edwards |

(56) References Cited

U.S. PATENT DOCUMENTS

| | | |
|---|---|---|
| 2014/0317454 A1 | 10/2014 | Gataullin et al. |
| 2014/0317603 A1 | 10/2014 | Gataullin et al. |
| 2014/0317604 A1 | 10/2014 | Gataullin et al. |
| 2014/0317605 A1 | 10/2014 | Gataullin et al. |
| 2014/0317606 A1 | 10/2014 | Gataullin et al. |
| 2014/0359126 A1 | 12/2014 | Breternitz |
| 2014/0365544 A1 | 12/2014 | Moffitt |
| 2014/0365545 A1 | 12/2014 | Moffitt |
| 2015/0033172 A1 | 1/2015 | Krajec |
| 2015/0066869 A1 | 3/2015 | Seto et al. |
| 2015/0067652 A1 | 3/2015 | Seto et al. |
| 2015/0067654 A1 | 3/2015 | Seto et al. |
| 2015/0212928 A1 | 7/2015 | Gounares |
| 2015/0242303 A1 | 8/2015 | Gautallin et al. |
| 2015/0347277 A1 | 12/2015 | Gataullin et al. |
| 2015/0347283 A1 | 12/2015 | Gataullin et al. |
| 2015/0347628 A1 | 12/2015 | Krajec |
| 2016/0133035 A1 | 5/2016 | Krajec |
| 2016/0196201 A1 | 7/2016 | Seto et al. |
| 2016/0283362 A1 | 9/2016 | Seto et al. |

FOREIGN PATENT DOCUMENTS

| | | |
|---|---|---|
| EP | 610581 | 8/1994 |
| EP | 2390790 | 11/2011 |
| WO | 0007100 | 2/2000 |
| WO | 2010039893 | 4/2010 |
| WO | 2011116988 | 9/2011 |
| WO | 2011142720 | 11/2011 |
| WO | 2011146750 | 11/2011 |
| WO | 2012106571 | 8/2012 |
| WO | 2014120263 | 8/2014 |

OTHER PUBLICATIONS

"Notice of Allowance Issued in U.S. Appl. No. 13/949,978", Mailed Date: Nov. 13, 2015, 10 Pages.

"Notice of Allowance Issued in U.S. Appl. No. 13/949,978", Mailed Date: Jul. 10, 2015, 9 Pages.

"International Search Report Issued in PCT Application No. PCT/US2014/011798", Mailed Date: Jun. 20, 2014, 3 Pages.

"International Search Report and Written Opinion", Korea Intellectual Property Office, PCT/US2014/011733, May 8, 2014, 10062-02.

Aguilera, et al., "Performance Debugging for Distributed Systems of Black Boxes", ACM, 2003, pp. 74-89.

Hsu, et al., "Visibility Enhancement for Silicon Debug", ACM, 2006, pp. 13-18.

Ungar, et al., "Self", ACM, 2007, pp. 1-50.

Kaya, et al., "Error Pattern Analysis of Augmented Array Codes Using a Visual Debugging Tool", IEEE, 2006, pp. 1-6.

LabVIEW, "Debugging Techniques", Jun. 2011, 7 pages. Available at <<http://zone.ni.com/reference/en-XX/help/371361H-01/lvconcepts/debug_techniques/>>.

Kumar, et al., "Visualization of Clustered Directed Acyclic Graphs with Node Interleaving", ACM, pp. 1800-1805, Mar. 2009.

Natour, "On the Control Dependence in the Program Dependence Graph", ACM, pp. 510-519, 1988. (The month of Publication is irrelevant since the year of Publication is clearly prior to the filing of the Application).

Ioannidis et al., "Transitive Closure Algorithms Based on Graph Traversal", ACM Transactions on Database sSystems, vol. 18, No. 3, pp. 512-579, Sep. 1993.

Fu, et al., "De-anonymizing Social Graphs via Node Similarity", ACM, pp. 263-264, Apr. 2014.

Supplementary Search Report Issued in European Patent Application No. 13873476.9, mailed date: Aug. 2, 2016, 10 pages.

Barbosa et al. "Interactive SNMP Traffic Analysis Through Information Visualization" In Proceedings of the IEEE Network Operations and Management Symposium (NOMS), Apr. 19, 2010, pp. 73-79.

Dobrev et al. "Visualization of Node Interaction Dynamics in Network Traces" In Proceedings of the 3rd International Conference on Autonomous Infrastructure, Management and Security, AIMS 2009, Enschede, Jun. 30, 2009, pp. 147-160.

Joyce et al. "Monitoring Distributed Systems" In Journal of ACM Transactions on Computer Systems (TOCS), vol. 5, Issue 2, May 1, 1987, pp. 121-150.

International Search Report and Written Opinion for PCT/US2013/043492 mailed Nov. 6, 2013, 11 pages.

International Search Report and Written Opinion for PCT/US2013/073894 mailed Apr. 1, 2014.

International Search Report and Written Opinion for PCT/US2013/044193 mailed Oct. 29, 2013.

International Search Report and Written Opinion for PCT/US2013/046050 mailed Nov. 8, 2013.

International Search Report and Written Opinion for PCT/US2013/046922 mailed Dec. 17, 2013.

International Search Report and Written Opinion for PCT/US2013/043522 mailed Nov. 6, 2013.

Gephi Tutorial Layouts, Gephi, Jun. 13, 2011.

International Search Report and Written Opinion for PCT/US2013/046664 mailed Nov. 20, 2013.

International Search Report and Written Opinion for PCT/US2013/047211 mailed Nov. 27, 2013.

International Search Report and Written Opinion for PCT/US2013/046925 mailed Nov. 25, 2013.

International Search Report and Written Opinion for PCT/US2013/046918 mailed Nov. 25, 2013.

International Search Report and Written Opinion for PCT/US2013/043811 mailed Nov. 28, 2013.

"Method and System for Automatically Tracking User Interactions and Providing Tags to the User Interactions" An IP.com Prior Art Database Technical Disclosure, Dec. 4, 2010.

International Search Report and Written Opinion for PCT/US2014/011727, mailed May 16, 2014.

Grossbart "Javascript Profiling with the Chrome Developer Tools" Smashing Magazine Website, Jun. 12, 2012.

Cantrill "Instrumenting the Real-Time Web: Node.js in Production" Node Summit 2012 Presentation; Jan. 24-25, 2012.

Whitehead "Java Run-Time Monitoring, Part 2: Postcompilation Instrumentation and Performance Monitoring—Interception, Class Wrapping, and Bytecode Instrumentation" IBM.com Website Aug. 5, 2008.

Kinsey "Under the Hood: The JavaScript SDK—Error Handling" Facebook.com website Nov. 1, 2012.

"Automagically Wrapping JavaScript Callback Functions" tlrobinson.net.blog, Oct. 22, 2008.

International Search Report and Written Opinion for PCT/IB2014/060233 mailed Nov. 11, 2014.

Heer et al. "Prefuse" CHI 2005, Conference Proceedings, Conference on Human Factors in Computing Systems; Apr. 2, 2005, pp. 421-430.

European Search Report for EP 13873299 dated Sep. 21, 2016.

U.S. Appl. No. 13/757,598, Jul. 17, 2014, Office Action.
U.S. Appl. No. 13/899,504, Jul. 21, 2014, Office Action.
U.S. Appl. No. 13/757,625, Aug. 13, 2014, Office Action.
U.S. Appl. No. 13/899,507, Sep. 11, 2014, Office Action.
U.S. Appl. No. 13/899,503, Sep. 12, 2014, Office Action.
U.S. Appl. No. 13/757,570, Nov. 14, 2014, Office Action.
U.S. Appl. No. 13/757,625, Jan. 2, 2015, Office Action.
U.S. Appl. No. 13/899,507, Jan. 7, 2015, Office Action.
U.S. Appl. No. 13/757,598, Feb. 13, 2015, Office Action.
U.S. Appl. No. 13/899,503, Mar. 11, 2015, Office Action.
U.S. Appl. No. 13/899,504, Mar. 11, 2015, Office Action.
U.S. Appl. No. 13/757,570, Jul. 29, 2015, Office Action.
U.S. Appl. No. 13/757,582, Aug. 7, 2015, Office Action.
U.S. Appl. No. 13/899,503, Nov. 3, 2015, Office Action.
U.S. Appl. No. 13/899,504, Nov. 6, 2015, Office Action.
U.S. Appl. No. 14/666,120, May 24, 2016, Office Action.
U.S. Appl. No. 13/899,504, May 26, 2016, Office Action.
U.S. Appl. No. 13/899,503, Jun. 2, 2016, Office Action.
U.S. Appl. No. 13/899,503, Oct. 5, 2016, Office Action.
European Search Report for EP 14801342 dated Dec. 6, 2016.

(56) References Cited

OTHER PUBLICATIONS

Vetter et al. "Real-Time Performance Monitoring, Adaptive Control, and Interactive Steering of Computational Grids", International Journal of High Performance Computing Applications, vol. 14, No. 4, 2000, pp. 357-366.
Office Action dated Nov. 17, 2016 cited in U.S. Appl. No. 13/757,570.
Office Action dated Dec. 30, 2016 cited in U.S. Appl. No. 13/899,504.
Notice of Allowance dated Jan. 20, 2017 cited in U.S. Appl. No. 14/666,120.
Huang et al. "Force-Transfer: A New Approach to Removing Overlapping Nodes in Graph Layout", ACM, pp. 1-10, 2003.
Nusayr et al. "Using AOP for Detailed Runtime Monitoring Instrumentation", ACM, pp. 8-14, 2009.
Reiss, "Visualization Program Execution Using User Abstractions", ACM, pp. 125-134, 2006.
Office Action issued in Chinese Patent Application No. 201380075229.5 mailed Mar. 1, 2017.
Office Action issued in Chinese Patent Application No. 201480029533.0 dated Mar. 20, 2017.
Supplementary European Search Report issued in EPO Application No. 14801342.8 dated Apr. 10, 2017.
Bita Mazloom et al: "Dataflow Tomography", ACM Transactions On Architecture and Code Optimization, vol. 9, No. 1, Mar. 2012, pp. 1-26.
Lienhard A et al: "Taking an object-centric view on dynamic information with object flow analysis", Computer Languages. Systems & Structures, Pergamon, Amsterdam, NL, vol. 25, No. 1, Apr. 2009, pp. 63-79.
Extended European Search Report issued in EPO Patent Application No. 14829908.4 dated Apr. 11, 2017.
U.S. Appl. No. 13/899,504, dated Apr. 5, 2017, Notice of Allowance.
Extended Search Report Issued in European Patent Application No. 14843127.3, dated Apr. 13, 2017, 9 Pages.
First Office Action and Search Report Issued in Chinese Patent Application No. 201380075253.9, dated Apr. 5, 2017, 27 Pages.
U.S. Appl. No. 13/757,570, dated May 19, 2017, Office Action.
U.S. Appl. No. 13/949,994, dated May 19, 2017, Office Action.

\* cited by examiner

EVENT CHAIN VISUALIZATION OF PERFORMANCE DATA

CROSS-REFERENCE TO RELATED APPLICATIONS

This application is a continuation of U.S. patent application Ser. No. 13/949,978 filed on Jul. 24, 2013, entitled "EVENT CHAIN VISUALIZATION OF PERFORMANCE DATA," which issued as U.S. Pat. No. 9,280,841 on Mar. 8, 2016, and which application is expressly incorporated herein by reference in its entirety. This application is also related to co-pending U.S. patent application Ser. No. 13/949,994 filed on Jul. 24, 2013, entitled "TIMELINE CHARTS WITH SUBGRAPHS," which application is expressly incorporated herein by reference in its entirety.

BACKGROUND

Event chain visualizations, such as Gantt charts, are mechanisms that can illustrate connected items in a sequence. In the case of a Gantt chart, work items are illustrated as bars in a timeline, with each bar illustrating a length of time that a work item may take.

SUMMARY

An event chain visualization of performance related data may show monitored elements as bars or other shapes on a timeline, with connections or other relationships connecting the various bars into a sequential view of an application. The visualization may include color, shading, sparklines, sub-graphs, or other indicators to show resource utilization, performance metrics, or other data relating to the monitored elements. The visualization may be generated by monitoring many events, and each bar on a timeline may reflect multiple instances of a monitored element and, in some case, the aggregated performance of the multiple instances.

A timeline chart may represent multiple data sets gathered from multiple sequences of a process by placing sub-graphs within timeline bars. The sub-graphs may represent summarized data related to each event represented by a timeline bar. The timeline chart may present an overall view of a sequence of process steps with insights to the shape or distribution of the underlying observations. The timeline chart may be an instance of an event chain diagram, where the elements within the event chains are displayed with respect to time. The timeline chart may be presented as representing the aggregated dataset of multiple runs, as well as a representation of a single observed sequence. In both cases, sub-graphs may be included in a timeline bar to represent different views of the aggregated dataset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Event Chain Visualization of Performance Data

Figure 1A:
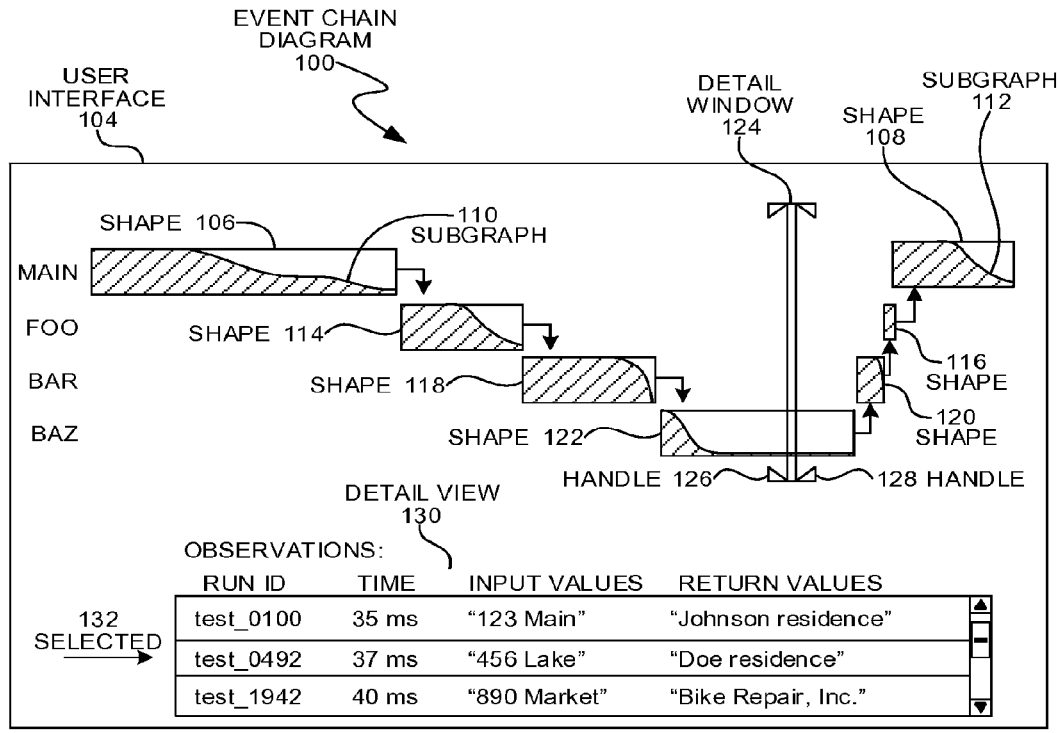
FIG. 1A is a diagram illustration of an example embodiment showing an event chain diagram showing aggregated data.

An event chain visualization of monitored data may render shapes representing monitored data for individual monitored elements. The shapes may be arranged in an event chain, with each shape having at least one dimension representing a measured or observed performance metric. The shapes may be connected with connectors, such as arrow lines, to visually illustrate relationships between the monitored elements.

The dimension may represent a maximum, minimum, average, median, or some other observation of the data. The parameter being measured may be time or some other resource.

The performance data may be observations of monitored elements that may be gathered when an application or other code has been executed. The observations may include multiple observations of the same monitored element, which may be represented in summary form in a shape representing the element.

The dimension of the shape representing a monitored element may give an instant, graphical representation of a single observed parameter. The relative dimension of one monitored element representation with another monitored element representation may show a user the relative proportion of the parameter at a glance.

Further, the relationships between monitored elements may be arranged in a sequential manner. The relationships may show dependencies, shared memory objects, or other relationships in a manner that can be quickly grasped.

In one use, a timeline chart or Gantt chart representation of an event chain may arrange shapes representing the time to process each monitored element, and arranged in sequential order as time progresses. Because each bar in a timeline chart may represent the maximum, minimum, or other observation, the horizontal length of the overall timeline chart may not represent any actual observed runs.

Additional data may be shown within the shape representing a monitored element. The additional data may include observation distributions in the form of line graphs, bar graphs, sparklines, variable shading, variable widths, or some other form. Such additional data may be useful to identify outliers or trends in the data, where the trends may be otherwise masked summarized statistics or single representative observations.

The event chain visualization may have a generalized view which may represent many sets of performance data, and a detailed view which may represent a single set of performance data along with a generalized view.

The detailed view may include representations of the generalized data set through the use of sparklines, sub-graphs, or other indicators, which may be presented to show both the detailed data of a single data set was well as the context of the single data set with respect to the larger, aggregated and summarized data set.

Throughout this specification and claims the term "timeline graph" and "timeline diagram" are used interchangeably. These terms are also used to denote a special case of an event chain diagram where the events are arranged with respect to time. In a typical timeline diagram, the horizontal axis of a graph may represent time. Other timeline diagrams may be oriented such that time may be represented on a vertical axis or some other direction.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1B:
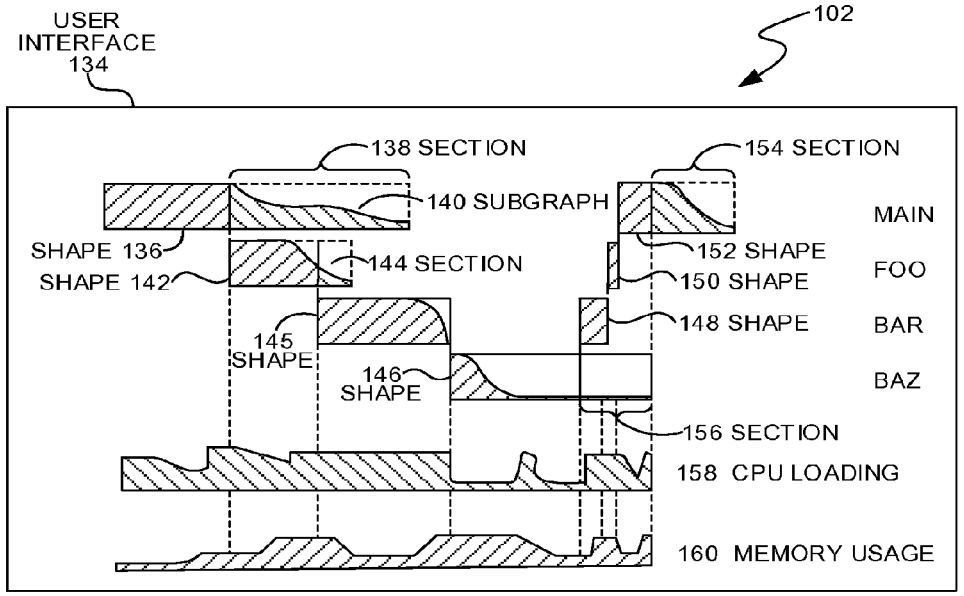
FIG. 1B is a diagram illustration of an example embodiment showing an event chain diagram showing a selected data set, as well as aggregated data.

FIG. 1A is an illustration of an example embodiment 100 showing an event chain diagram. FIG. 1B is an illustration of an example embodiment 102 showing a detailed view of a single data set from embodiment 100.

Embodiment 100 illustrates an event chain diagram that may represent multiple sets of performance data. In the example of embodiment 100, tracer data from a fictitious application is shown. The application may contain four distinct code elements, named MAIN, FOO, BAR, and BAZ. The tracer data may include performance data gathered from multiple runs of the application, with the data comprising processing time, CPU loading, memory consumption, and other data elements in our example.

The event chain diagram may show summarized data from multiple data sets in at least two manners. In the first manner, the size of the shapes in the event chain diagram may reflect a summarized statistic for each of the code elements that were observed. The summarized statistic may be, for example, maximum time taken to process the code element represented by the shape as may be represented in the example of embodiment 100.

In the examples of FIGS. 1A and 1B, the horizontal axis of the various shapes and diagrams may represent time.

The event chain diagram of embodiment 100 may show the worst case timeline from the performance data. In other words, the shapes may be sized to represent the longest time observed for each code element, then placed together in sequential relationships such that the overall length of the diagram may or may not reflect the length of the worst case data set.

The summarized statistic represented by the horizontal length of the various shapes may be any summarization or representation of the underlying data. In the example of embodiment 100, the representation may be the maximum value of any observation. Other examples may use a maximum, minimum, median, mean, standard deviation, multiples of the standard deviation, or some other summarization or observation to represent an element in an event chain diagram.

Within each shape representing a code element, a sub-graph may be included. The sub-graphs may give additional information about the underlying data, and may give the user a sense of the profile of the data distribution. In many cases, the distribution profile may show the user if many of the observations were tightly clustered, identify outliers, or other indicators about the data.

Shapes 106 and 108 may represent the observations of a function named MAN, when MAIN was invoked two times. Shape 106 may represent the first instances MAIN was invoked, and shape 108 may represent the second instance.

A sub-graph 110 may illustrate a distribution of the observations collected for the first instance of MAN. The sub-graph 110 may be show the cumulative number of observations that had a given length of time, as represented by the horizontal axis. The shape of sub-graph 110 illustrates that all the observations were at least as long as about ⅓ of the total length of time, and that there is a wide variation in data points as time increases.

The sub-graph may be a sparkline or other small graphical representation of the underlying data. The sub-graph may take on many forms, examples of which may be found in embodiment 300 presented later in this specification.

The sequence of items in the event chain diagram may start with shape 106, then proceed to shape 114 representing the function FOO, shape 118 representing the function BAR, shape 122 representing the function BAZ, and back to shape 116 representing BAR, shape 116 representing the function FOO, and finally at function MAN with shape 108. The sequence of items may represent the flow of control, data items, or other connections between the various items.

Within each shape, a sub-graph may illustrate some aspect of the underlying data. From examination of the example, shape 122 may illustrate an example of a sub-graph that may represent a dataset that contains a very wide distribution of data elements, with the possibility that there may be outliers on the high end of the scale.

A detail window 124 may be an interactive element by which a user may browse the underlying data in more detail. The detail window 124 may be moved back and forth using handles 126 and 128, which may be moved by clicking and dragging the handles. The detail window 124 may be expanded, contracted, and moved to different locations across the event chain diagram, and the underlying data may be presented in a detail view 130.

The detail view 130 may illustrate some of the underlying data that may be represented by the detail window 124. In the example, the selected observations may be displayed by RUN_ID, time, input values, and return values. Through the user interface 104, a user may be able to scroll through the various data elements and select an element for a detailed view. In the example, the selected element 132 is shown.

FIG. 1B may illustrate an event chain diagram 102 that shows the detail of the selected element 132. The event chain diagram 102 may include some elements from the event chain diagram 100, but arranged in a manner to show the details of the selected element 132.

The various shapes in diagram 102 may be arranged to reflect the selected element 132. The sequence of events may be shown by shape 136 connected to shape 142, which is connected in succession to shapes 145, 146, 148, 150, and finally shape 152.

The size of the shapes and the positioning of the subsequent shape may indicate the actual length of time observed for the selected dataset. In order to illustrate the entire dataset, the shapes may be shaded, greyed out, differently colored, or have some other visual effect that may show the larger dataset.

For example, shape 136 may have a section 138 that may be greyed out, but may still contain a sub-graph 140. The left hand side of the shape 136 that may not be greyed out may represent the value of the underlying data in the selected element 132, while the remaining section 138 may give the user a visual hint as to where the selected element 132 fell in the distribution represented by the sub-graph 140.

Shape 142 may be illustrated with section 144 greyed out, as shape 146 may also be illustrated with section 156 greyed out and shape 152 may be illustrated with section 154 greyed out. With each of the shapes that have greyed out portions, a user may be able to determine where the selected data set fell within the distribution of each observation. Such an illustration may communicate contextual data while also communicating detailed data about a specific set of observations.

Graphs representing CPU loading 158 and memory usage 160 may also be included in the diagram 102. The CPU loading 158 and memory usage 160 may be additional sets of data may match the timeline of the event chain diagram 102 and may relate to the selected element 132.

In the example of embodiments 100 and 102, the each shape has a dimension that may be scaled to represent a certain data element. In the case of the examples, such a dimension may be related to time. Other examples may relate the dimension to any other measured or observed parameter.

Figure 2:
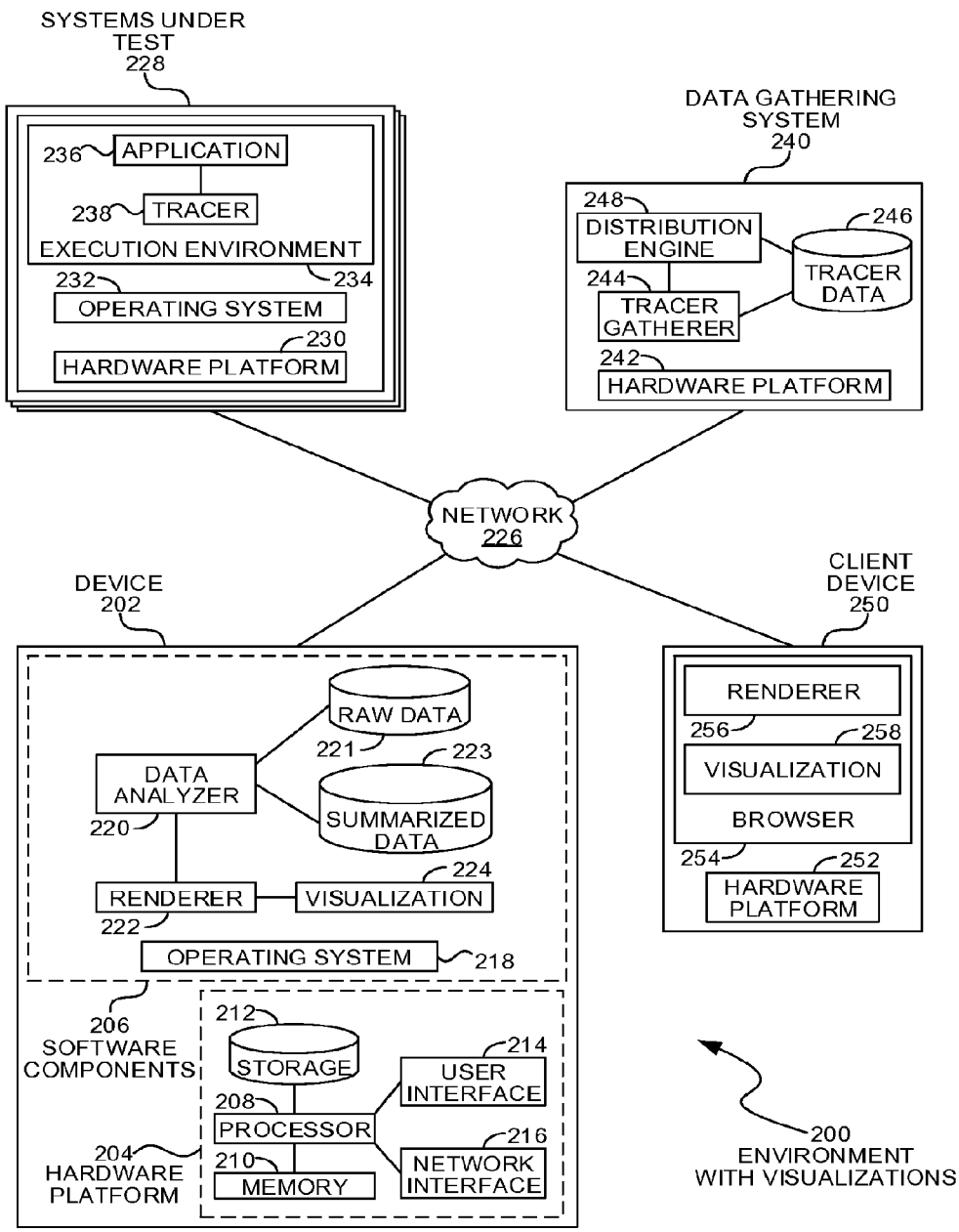
FIG. 2 is a diagram illustration of an embodiment showing a network environment with devices that may create and view tracer data.

FIG. 2 is a diagram of an embodiment 200 showing components that may generate performance data and display the performance data using an event chain diagram. The example of embodiment 200 is merely one example of a multi-device system that may generate performance data and display the data in an event chain diagram. Other architectures may include single device and multiple device architectures.

A single device architecture may gather performance data, analyze the data, and graphically display the data or perform bottleneck detection.

A multiple device architecture may divide different components of the data gathering and analysis functions over different devices. The multiple device architecture may be one way to deliver complex tracing services without having to install and maintain all of the various tracing components on a single system.

The example of embodiment 200 gathers tracer data from several systems under test, then generates and renders an event chain diagram as a visualization. The tracer data may be a large amount of historical data, which may be summarized in an event chain diagram, as well as viewed using a detailed event chain diagram that may include summarized data from multiple data sets while viewing one data set.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. An operating system may provide an abstraction layer between executing routines and the hardware components 204, and may include various routines and functions that communicate directly with various hardware components.

A data analyzer 220 may analyze raw data 221 and generate summarized data 223 that may be consumed by a renderer 222 to generate a visualization 224. The raw data 221 may be any type of data that contains elements that may be related to each other so as to be displayed on an event chain diagram.

In an event chain diagram, several elements may be displayed with relationships to each other. A common example may be a Gantt chart that may show work items of a project, where various work items may be connected by dependencies. The elements may be presented with contextual data in the form of sparklines or sub-graphs. Such event chain diagram may present summarized data or data from a single run of a measured process.

The summarized data may aggregate multiple runs of a measured process, where each run may be a separate data set representing a single run through the process. One example of such a data set may be tracer data, which may be gathered by monitoring an application over time. While a tracer gathers data, an application may be subjected to multiple inputs, each of which may cause the application to execute code elements in a process that may be displayed in an event chain diagram.

The example of embodiment 200 illustrates a system where tracer data may be collected, processed, and visualized. Other systems may gather, process, and visualize data for other types of processes or sequences.

The device 202 may create visualizations 224 which may be viewed on the device 202 or on another device. In some cases, the visualizations may be static visualizations, while in other cases, the visualizations may be interactive such that a user may be able to explore, browse, and otherwise interact with the data.

A network 226 may connect a group of systems under test 228 from which observations and measurements may be taken. Each of the systems under test 228 may have a hardware platform 230, which may be similar to the hardware platform 204 of the device 202. The systems under test 228 may have an operating system 232 on which an execution environment 234 may run. Within the execution environment 234, an application 236 may be executed with a tracer 238. The tracer 238 may monitor, measure, probe, instrument, or otherwise gather data while the application 236 executes.

The tracer 238 may transmit the collected data to a data gathering system 240. The data gathering system 240 may have hardware platform 242 which may be similar to the hardware platform 204 of the device 202. A tracer gatherer 244 may collect and store tracer data 246 from the various tracers 238. A distribution engine 248 may be a communications portal through which other systems may access the tracer data 246, such as the data analyzer 220 of the device 202.

A client device 250 may be an example of a device that may render and visualize the data. In such an example, some or all of the summarization or processing of the tracer data may be performed on another device, such as the device 202.

The client device 250 may have a hardware platform 252 which may be similar to the hardware platform 204 of device 202. A browser 254 may execute code that operates as a renderer 256 to show a user the visualization 258. In some cases, the visualization 258 may be presented in a browser, where the renderer may execute on the device 202. Such a case may create a visualization 224 on the device 202, and an image from the renderer 222 may be transmitted and displayed by the browser 254.

Figure 3:
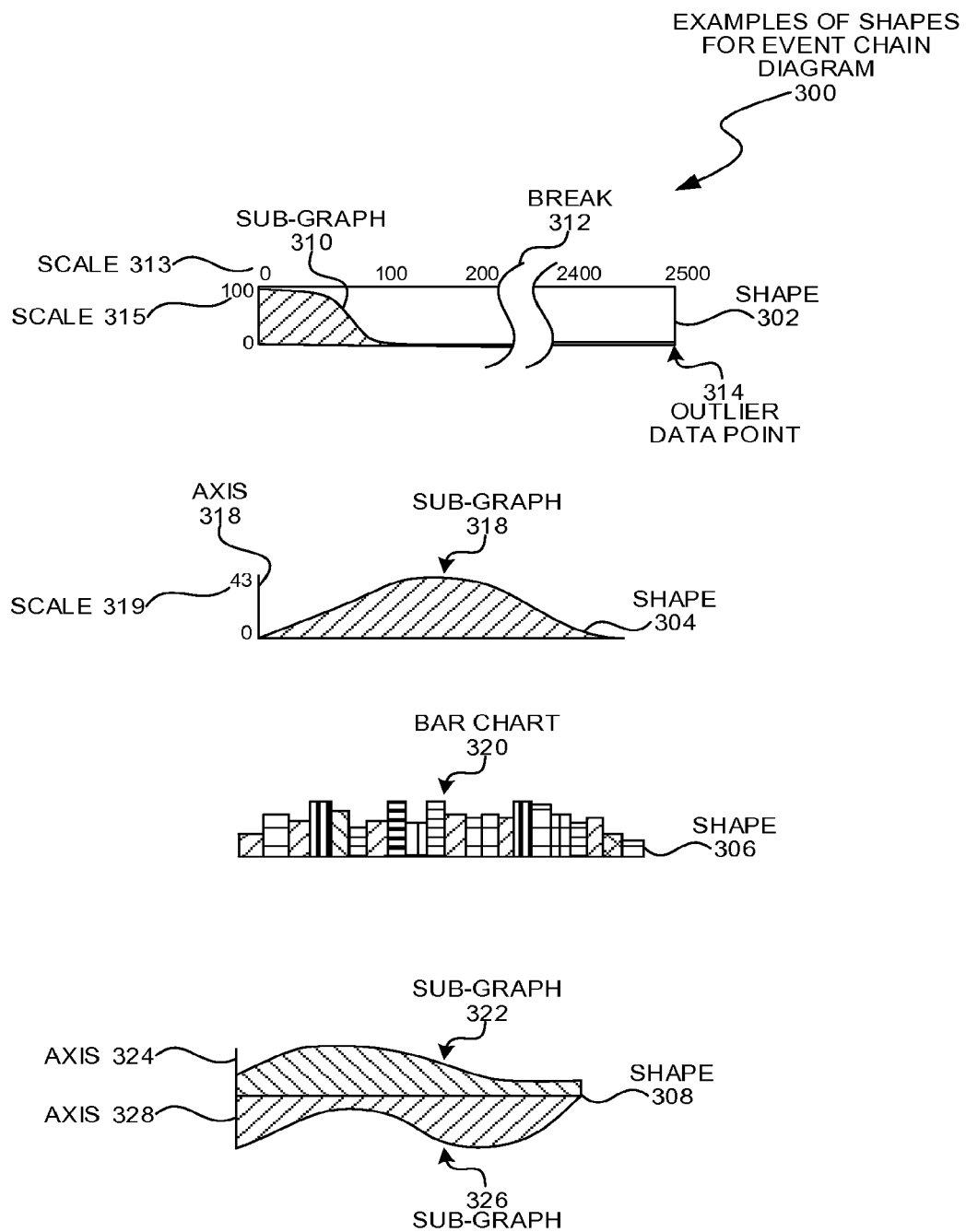
FIG. 3 is a diagram illustration of several example embodiments showing sub-graphs that may be applied to different shapes.

FIG. 3 is a diagram illustration of an embodiment 300 showing several examples of shapes that may be used to represent an element in an event chain diagram, such as the event chain diagrams illustrated in FIGS. 1A and 1B.

The examples of shapes 302, 304, 306, and 308 are examples where the underlying shape may be a rectangle or line. In each of the examples, the shapes may be illustrated with the horizontal axis as the dimension sized to represent a data value.

Shape 302 is an example of a shape that may be broken such that the length of the shape may not represent the full value of the data element it may represent. The shape 302 may have a sub-graph 310 that may contain an outlier data point 314. Because the outlier data point 314 may cause the shape 302 to be very large, a break 312 may be inserted and the length of the shape 302 may be condensed. The break 312 may indicate that the length of the shape 302 may have been shortened.

The shape 302 may have a scale 313 on the horizontal axis. The scale may help a user understand the actual values of the underlying data. Because of the break 312, the scale 313 may be a visual indicator of how much the shape 302 may have been shortened by the break 312.

Shape 304 is an example of a shape that may have a different type of sub-graph 318. The shape 304 may be a line to which a sub-graph 318 may be attached. The sub-graph 318 may have an axis 316. The axis 316 may be perpendicular to the horizontal length of the shape 304. The axis 316 may have a scale 319. In some cases, a vertical axis may not have a scale.

The sub-graph 318 may show a distribution of the underlying data. The sub-graph 310 of shape 302 may be an example of a cumulative distribution, whereas the sub-graph 318 of shape 318 may be a conventional distribution illustration. A cumulative distribution may be useful in some cases where outliers may exist on one end of the distribution, while a conventional distribution may be useful when outliers may exist on both ends of the distribution.

Shape 306 is an example with a sub-graph that may be a bar chart 320. The bar chart 320 may include one bar for each data set or may represent groups of data sets.

Shape 308 is an example of a shape with two sub-graphs. Sub-graph 322 may be shown on the top with axis 324, while sub-graph 326 may be shown with axis 328. The axes may be illustrated with values or without values.

Figure 4:
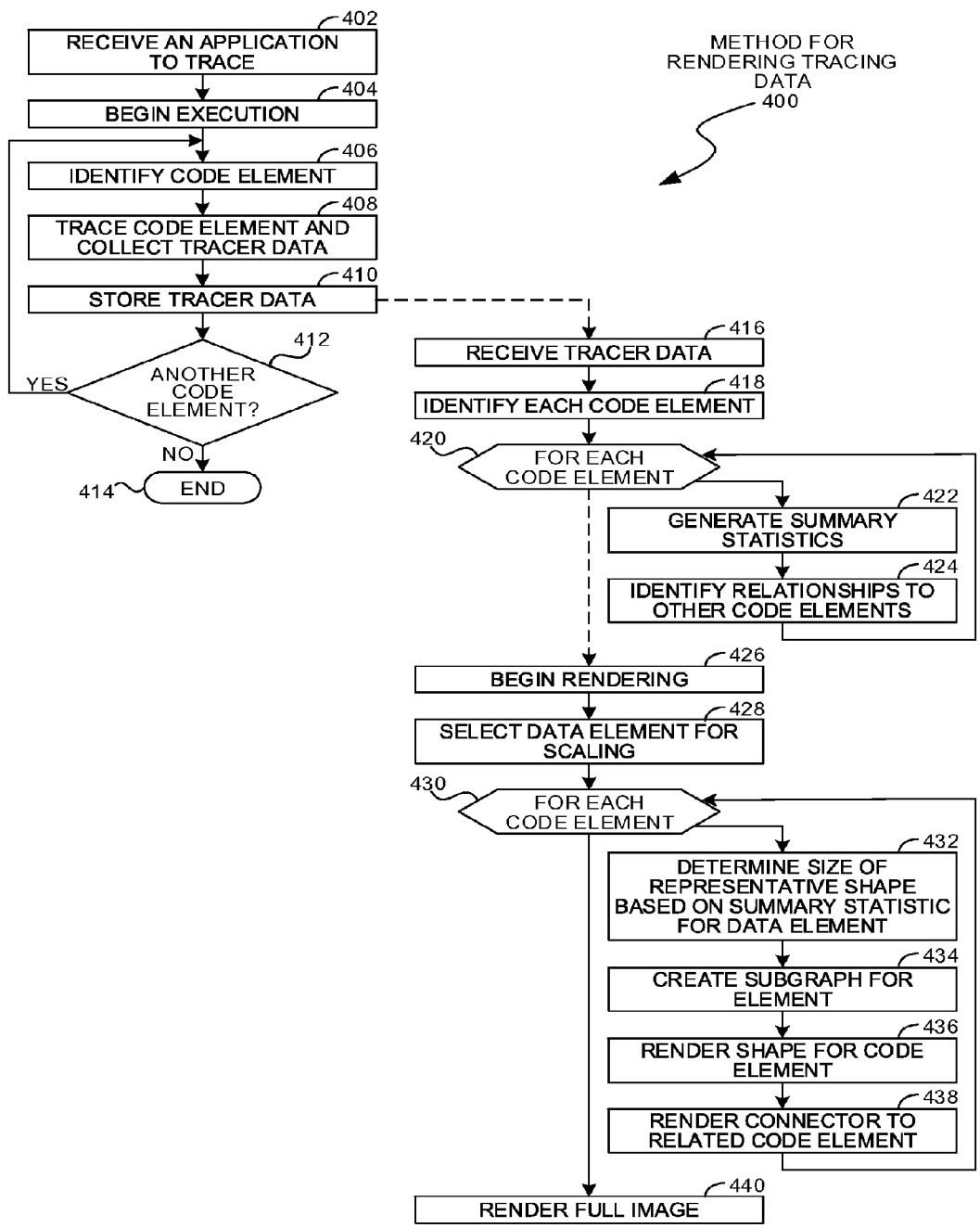
FIG. 4 is a flowchart illustration of an embodiment showing a method for creating an event chain diagram for an aggregated view of multiple data sets.

FIG. 4 is a flowchart illustration of an embodiment 400 showing a method for generating data, processing the data, and rendering a graph illustrating the data. The operations of embodiment 400 may illustrate the operations that may be performed with the components of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may illustrate a method by which data may be generated by tracing an application. Once the tracer data has been stored, the tracer data may be summarized and rendered in a visualization, such as an event chain diagram. Examples of such diagrams may be found in FIGS. 1A and 1B.

An application may be received in block 402 for tracing. Execution may begin in block 404. A code element may be identified in block 406 and the code element may be traced in block 408 to collect tracer data, which may be stored in block 410. When another code element is encountered in block 412, the process may loop back to block 406. When all the code elements have been executed in block 412, the data collection process may end in block 414.

The tracer data may be any data gathered while the application executes. Such data may include observations about start time and end time, as well as resource consumption data, data regarding the performance of the code element, or any other data.

The tracer data may be received in block 416. Each code element in the tracer data may be identified in block 418 and processed in block 420.

For each code element in block 420, summary statistics may be generated in block 422 and relationships to other code elements may be identified in block 424.

After generating summary statistics, rendering may begin in block 426.

A data element may be selected in block 428 for scaling. The data element may be the dimension for which the overall graph may be scaled. In the examples of FIGS. 1A and 1B, the dimension may be time.

For each code element in block 430, a size of a representative shape may be determined in block 432. The size may be determined from the summary statistic, which may be the maximum value of an observation of the code element. In other embodiments the minimum, average, mean, or some other representative observation may be used.

A sub-graph may be created for the element in block 434. The sub-graph may be any representation of the underlying data for the code element represented by the shape. The sub-graph may be a distribution of the underlying data or some other representation of the underlying data, which may be aggregated from multiple observations of the code element.

The shape may be rendered in block 436. A connector may be rendered in block 438 to graphically connect the block to any other blocks to which a relationship may be found.

The entire image may be rendered in block 440.

Figure 5:
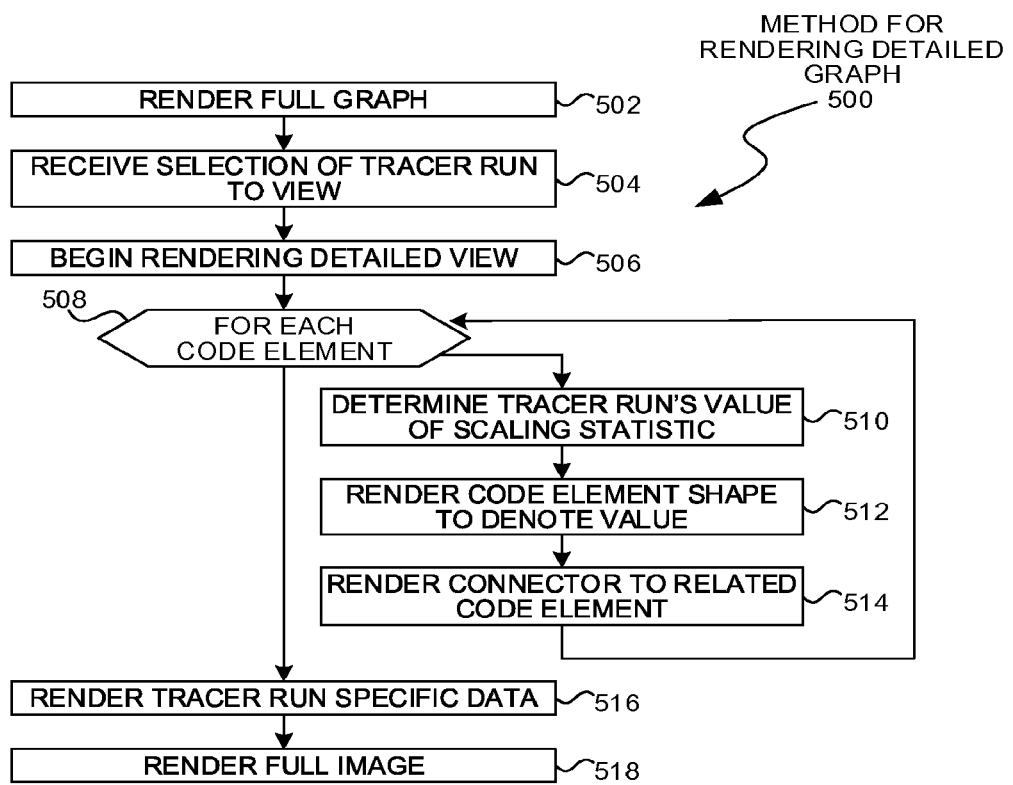
FIG. 5 is a flowchart illustration of an embodiment showing a method for creating an event chain diagram for a detailed view of a specific data set along with aggregated information in sub-graphs.

FIG. 5 is a flowchart illustration of an embodiment 500 showing a method for changing from an aggregated view of the data to viewing a data set for a specific sequence. Embodiment 500 is an example method that may be performed in response to a user selection to change from an aggregated view to a specific view, such as may be illustrated in the change from the diagrams illustrated in FIG. 1A and FIG. 1B.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The full graph may be rendered in block 502. The full graph may be a representation of a data set aggregated from multiple tracer runs. An example of creating such a graph may be found in embodiment 400.

The graph may be an interactive graph, which may have various mechanisms to browse and select individual data sets. In the example of FIG. 1A, such a selection mechanism may include the detail window 124 and detail view 130. The selection of an individual data set to view may be received in block 504.

The rendering of a detail view may begin in block 506. For each code element in block 508, the value from the selected data set corresponding to the current code element may be determined. In block 510, the code element shape may be rendered to show the determined value. In many embodiments, the shape may be greyed out, dashed, or otherwise have a visual modifier applied. Examples of such an operation may be found in shape 136 in FIG. 1B, where the shape 136 may be rendered with section 138 greyed out. A connector may be rendered in block 514.

Additional data may be rendered in block 516. The additional data may be data specific to the selected individual data set. Examples of such additional data may be the CPU loading 158 and memory usage 160 in FIG. 1B.

The full image may be rendered in block 518 and presented to a user.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by at least one computer processor, said method comprising:
   receiving trace data gathered from an application, said application comprising monitored elements, said trace data comprising performance observations from said monitored elements;
   identifying a first monitored element and a second monitored element within said trace data, said first monitored element having a relationship with said second monitored element;
   creating a first geometric shape representing a first monitored element, said first geometric shape having a first dimension;
   determining a first value for said first dimension from an aggregation of a plurality of said performance observations, said first value representing a first observation of said plurality of said performance observations;
   creating a second geometric shape representing a second monitored element, said second geometric shape having said first dimension;
   determining a second value for said first dimension from an aggregation of a second plurality of said performance observations, said second value representing a second of said second plurality of said performance observations; and
   rendering said first geometric shape and said second geometric shape.

2. The method of claim 1 further comprising:
   determining a curve representing said first plurality of performance observations in said first dimension; and
   rendering said curve within said first geometric shape.

3. The method of claim 2, said curve being a line graph.

4. The method of claim 2, said curve being variable shading within said first geometric shape.

5. The method of claim 1, said first dimension representing time.

6. The method of claim 1, said first dimension representing resource utilization, said resource utilization comprising one or more of memory resource utilization, processor resource utilization or network resource utilization.

7. The method of claim 1, said first geometric shape being a rectangle with said first dimension being a horizontal length of said rectangle.

8. The method of claim 1, said first observation being a maximum observation of said plurality of said performance observations.

9. The method of claim 1, said relationship being a sequential relationship between said first monitored element and said second monitored element.

10. The method of claim 1, said relationship being a dependency relationship between said first monitored element and said second monitored element.

11. The method of claim 1, said relationship being a shared memory object relationship between said first monitored element and said second monitored element.

12. A system comprising:
   a processor;
   a rendering engine executing on said processor, said rendering engine that:
      receives trace data gathered from an application, said application comprising monitored elements, said trace data comprising performance observations from said monitored elements;
      identifies a first monitored element and a second monitored element within said trace data, said first monitored element having a relationship with said second monitored element;
      creates a first geometric shape representing a first monitored element, said first geometric shape having a first dimension;
      determines a first value for said first dimension from an aggregation of a plurality of said performance observations, said first value representing a first observation of said plurality of said performance observations;
      creates a second geometric shape representing a second monitored element, said second geometric shape having said first dimension;
      determines a second value for said first dimension from an aggregation of a second plurality of said performance observations, said second value representing a second of said second plurality of said performance observations; and renders said first geometric shape and said second geometric shape.

13. The system of claim 12, said rendering engine that further:

determines a curve representing said first plurality of performance observations in said first dimension; and displays said curve within said first geometric shape.

14. The system of claim 13, said curve being a line graph.

15. The system of claim 14, said curve being variable shading within said first geometric shape.

16. The system of claim 13, said first dimension representing time.

17. The system of claim 13, said first dimension representing resource utilization, said resource utilization being one or more of memory resource utilization, processor resource utilization or network resource utilization.

18. The system of claim 13, said first geometric shape being a rectangle and said first dimension being a vertical length of said rectangle.

19. The system of claim 13, said first observation being at least one of a minimum observation, an average observation or a median observation.

20. The system of claim 13, said relationship being one of a sequential relationship between said first monitored element and said second monitored element, a dependency relationship between said first monitored element and said second monitored element or a shared memory object relationship between said first monitored element and said second monitored element.

* * * * *